Inventor
W. I. Spangler
By W. S. McDowell
Attorney

Inventor
W. I. Spangler

By W. S. McDowell
Attorney

Patented Apr. 14, 1931

1,800,876

UNITED STATES PATENT OFFICE

WILLIAM I. SPANGLER, OF TARLTON, OHIO

GEAR TRANSMISSION

Application filed January 3, 1929. Serial No. 330,112.

This invention relates to power transmission mechanisms for motor vehicles and more particularly to the selective sliding gear type now in use.

The main object of the present invention resides in the provision of a transmission mechanism which eliminates the necessity of using the usual shift lever for shifting the gears within said transmission while the vehicle is in or entering congested traffic.

With the present day driving conditions which exist in the larger cities it is necessary, due to frequent stopping and starting of the vehicle, to change the gear ratio between the engine and the driving wheels of the vehicle to prevent stalling of the engine and putting an undue strain on the driving mechanism. This continuous changing of gears is not only laborious to the driver of the vehicle but is also cumbersome and tends to slow up the traffic in general as this operation is performed by the combined action of hand and foot controls. To overcome this objection, provision is made of supplemental gearing which is built into a standard type of transmission and which gearing is moved into driving alignment by the actuation of the usual clutch pedal, thereby eliminating the slow hand operation of shifting the gears in heavy traffic. This supplemental gearing may take the place of what is called the intermediate or second gear or may be of a ratio between the intermediate and the low gear, if so desired.

Another object of the invention is to provide a transmission mechanism of this character with a quicker and safer operation of the vehicle, as the driver thereof can use both hands on the steering apparatus for guiding the vehicle where traffic conditions are such that his attention is needed for the safe operation thereof.

With these and other objects in view, which will appear as the description proceeds, the invention consists in the novel features of construction, combinations of elements, and arrangements of parts hereinafter to be more fully described and pointed out in the appended claims.

Figure 1:
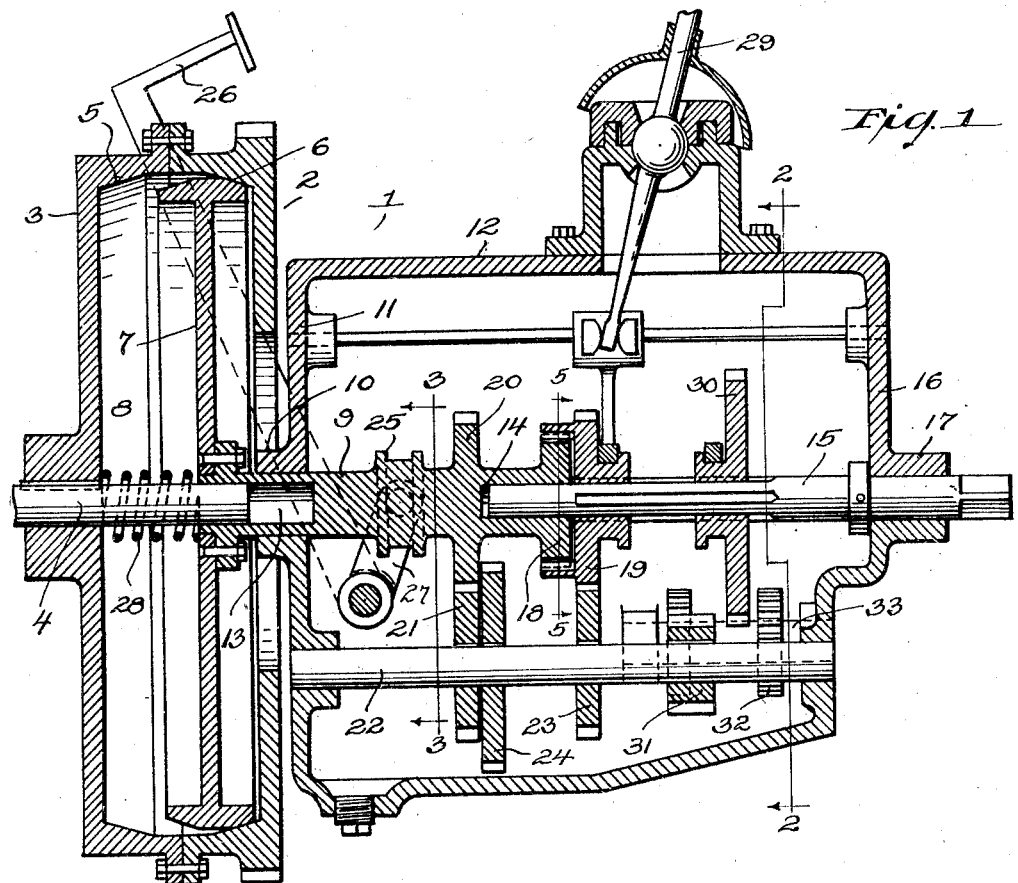
Figure 2:
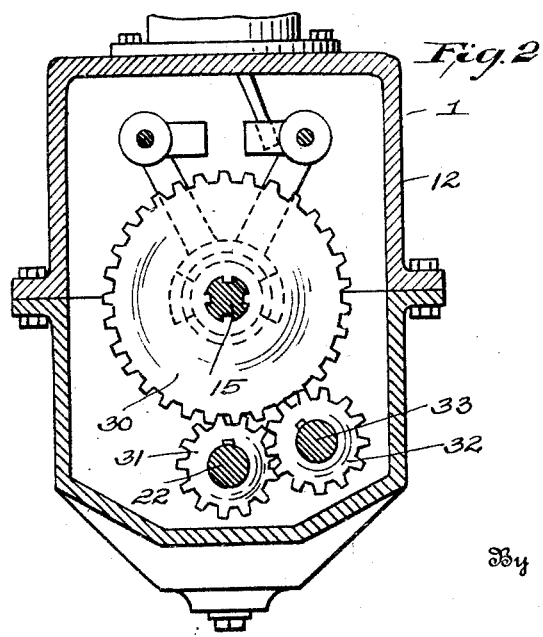
Figure 3:
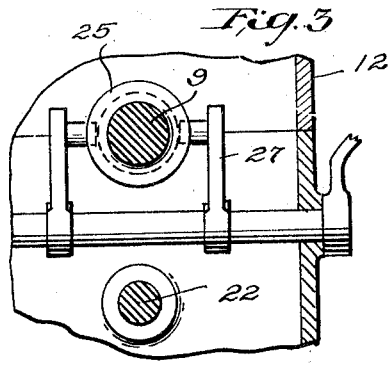
Figure 4:
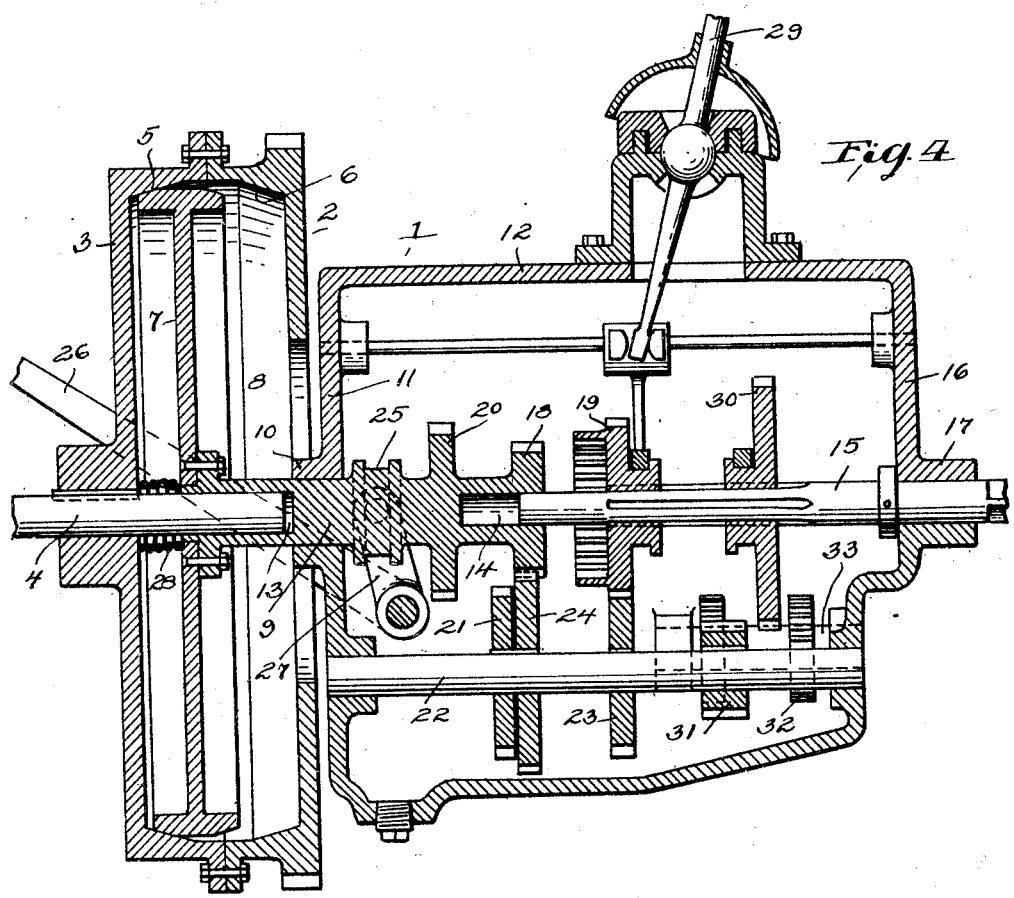
Figure 5:
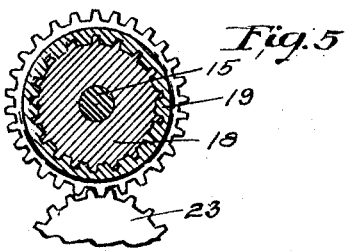

In the accompanying drawings:

Figure 1 is a vertical longitudinal section taken through the transmission comprising the present invention, Figure 2 is a transverse sectional view taken on the line 2—2 of Figure 1, Figure 3 is a similar view taken on the line 3—3 of Figure 1, Figure 4 is a view similar to that of Figure 1, showing the transmission used in accordance with the present invention, Figure 5 is a transverse sectional view taken on the line 5—5 of Figure 1.

Referring more particularly to the drawings, the numeral 1 designates a gear transmission in its entirety, the numeral 2 the clutch mechanism which in this instance, for the sake of simplicity, has been illustrated as a double cone or face clutch built into the fly wheel 3 of a motor vehicle engine (not shown). The fly wheel 3, which forms a part of the clutch mechanism 2, is keyed or otherwise secured to the engine shaft 4 and is provided with a pair of internally arranged, oppositely disposed clutch faces 5 and 6. These clutch faces are adapted for selective engagement with a similarly faced clutch engaging member 7 slidably positioned between the faces 5 and 6 and arranged within the clutch chamber 8 of the fly wheel 3 in axial alignment with the engine shaft 4. Bolted or otherwise connected with the clutch member 7, is a shaft section 9 which is slidably and rotatably received within a bearing 10 formed in the end wall 11 of the transmission housing 12 and which wall lies adjacent to the fly wheel 3. The shaft section 9 has its ends provided with sockets 13 and 14 forming bearings for one end of the engine shaft 4 and for the drive shaft 15 respectively. The sockets 13 and 14 are of such length as to permit the shaft section 9 to be moved longitudinally a distance equal to the spacing of the clutch faces 5 and 6 of the fly wheel 3. Axially aligned with the bearing 10 and formed with the opposite end wall 16 of the transmission housing 12 is a bearing 17 for the drive shaft 15, which together with the socket 14 of the shaft section 9 serves to hold the drive socket 15 in alignment with the shaft 9 and the engine shaft 4. Formed with the shaft section 9 at the opposite end to that of the clutch member 7 is a gear 18 which intermeshes with the teeth of the gear 19 slidably positioned upon the shaft 15. The teeth of the two gears act as a coupling between the two shafts and when intermeshed serve to establish a direct drive through the shaft 9 and the shaft 15. It will be understood, however, that this coupling may be of other construction than the one described herein to perform this function.

Positioned upon the shaft section 9 and arranged intermediate the ends thereof, is a second gear 20 which intermeshes with a gear 21 carried by the jack shaft 22. Also positioned upon this latter shaft and rotatable in connection therewith is a gear 23 which is adapted to intermesh with the gear 19 slidably carried by the shaft 15. The gears 21 and 23, which are keyed to the jack shaft 22, are of the same size in order to permit the latter shaft to rotate when the gears are in the position disclosed in Figure 1 of the drawing. Arranged between the gears 21 and 23 of the jack shaft is a gear 24 of larger diameter than that of the other gears just mentioned. This gear may take the place of what is called the intermediate or second gear or may be of a ratio between the second and the lower gear, if desired. The gear 24 when intermeshed with the gear 18 will establish a reduced gear ratio or a reduction in speed between the shafts 9 and 15 as will be readily understood by referring to the Figure 4 of the drawing.

To effect the sliding movement of the shaft section 9, the latter is equipped with a collar 25 which is operatively connected with the foot operating clutch pedal 26 by means of the yoke member 27 which is of the usual construction employed in mechanisms of this type.

In operation it will be seen that when the clutch member 7 is in engagement with the clutch face 6 of the fly wheel 3 and the gear 18 is in interlocking engagement with the gear 19, a direct drive is established through the shaft 15 which is led and operatively connected to the driving wheels of the vehicle for propelling the same over the road surface. If, however, it is desired to change the speed of the vehicle as when entering congested traffic it is merely necessary, in order to change the gear ratio, to press forward on the clutch pedal against the action of the coil spring 28 situated between one of the walls of the fly wheel 3 and the clutch engaging member 7. This will cause the member 7 to engage with the opposite clutch face 5 and at the same time withdraw the gear 18 from its engagement with the gear 19. Simultaneously with this operation the gear 20 will be disengaged from the gear 21 and the gear 18 will be moved forward into alignment with the gear 24 of the jack shaft 22, thus changing from a direct drive to a reduced gear ratio through the gears 18 and 24 and the gears 23 and 19 which are in driving alignment with each other.

To again establish a direct drive or to get the vehicle back into high gear it is merely necessary on the part of the operator to relieve the pressure of the foot pedal at which time the spring 28 will force the clutch member 7 into engagement with the face 6 and automatically establish the connection between the gears 18 and 19 as will be obvious. If it is desired to establish a gear ratio lower than that effected by the gears 18 and 24 or to put the car into reverse gear, the shift lever 29 may be utilized for making such changes between the gears 30, the gear 31 or with the gear 32, which latter gear is carried by the supplemental shaft 33 of the transmission, and by the provision of the gears 20 and 21 the clutch member 7 may engage with the face 6 in the same manner as when a direct drive is established.

In view of the foregoing it will be seen that the present invention provides for a transmission mechanism which is very simple in its construction, reliable in its operation and one which may be operated by the driver of the vehicle to make a quick change in speed thereof in entering congested traffic by merely operating the clutch pedal in the usual manner, thus eliminating the hand operation for making such changes in the gear ratio of the transmission. By operating the gear transmission with the clutch pedal traffic not only speeds up but it tends to assure a safer operation of the vehicle as the driver can use both hands for guiding the machine and his attention need not necessarily be detached from the traffic ahead by the operation of the shift lever.

What is claimed is:

1. In a mechanism of the character described, driving and driven shafts, a clutch member formed with a plurality of clutch engaging faces carried by said driving shaft, a gear transmission, a slidable driving connection between said clutch and transmission, a clutch face engaging member on said connection, a gear on said connection, a countershaft in said transmission, a gear on said countershaft adapted for engagement with the gear of said connection, an additional gear on said countershaft, a gear on said driven shaft for engagement with the latter gear of said countershaft and foot controlled means for effecting the sliding movement of said driving connection to align the gear thereof with one of the gears of said countershaft and to simultaneously move the clutch face engaging member into contact with the other of said clutch faces.

2. In a change speed mechanism, the combination with a clutch having a pair of clutch faces, of a gear transmission comprising a shaft section slidably connecting said clutch with said transmission and provided with a clutch face engaging member thereon normally in engagement with one of said faces, a driven shaft in said transmission in axial alignment with said shaft section, a countershaft in said transmission, intermeshing gears between said driven and countershaft, a gear on said shaft section, and foot controlled means for sliding said shaft section so that the gear thereon will mesh with a gear of said countershaft and to simultaneously effect the engagement of the face engaging member with the other of said clutch faces whereby a change in speed is effected between the driven shaft and said shaft section.

3. In a change speed mechanism, the combination with a clutch having a pair of clutch faces, of a gear transmission comprising a slidable shaft section connecting said clutch with said transmission and provided with a clutch face engaging member normally contacting with one of said clutch faces, a driven shaft in said transmission, means formed in connection with said driven shaft and said shaft section for establishing a direct drive therebetween, a countershaft having gears intermeshing with gears on said driven shaft, and means for establishing a driving connection between said countershaft and shaft section upon the actuation of the latter and to simultaneously effect the engagement of the clutch face engaging member with the other of said clutch faces.

4. In a traffic transmission mechanism, the combination with a gear transmission and clutch mechanism having a plurality of clutch engaging faces, of a shiftable driving connection connecting said clutch member with said transmission, said connection being formed with clutch face engaging means normally in contact with one of the clutch faces, a gear carried by said connection, a driven shaft within said transmission, means formed with said connection and driven shaft to establish a direct drive through said transmission, a countershaft in said transmission, intermeshing gears on said driven and countershaft, a second gear on said countershaft, and means including a foot pedal for controlling the shifting movement of said driving connection to cause the gear thereon to engage the second gear of said countershaft and to simultaneously break the direct drive between the driven shaft and driving connection and to effect the engagement of the face engaging means with the other of said clutch faces.

5. In a change speed mechanism, a driving member and a driven member, a clutch and gear transmission mechanism arranged between said members, said clutch being equipped with a pair of working faces, a clutch face engaging member disposed between said faces and normally operating to connect said clutch and transmission, a gear on said clutch face engaging member, a gear on said driven member, a countershaft in said gear transmission, gears on said countershaft one of which being adapted for engagement with the gear of said driven member, and foot controlled means for shifting said clutch engaging member into contact with one of said clutch faces and for simultaneously sliding the gear thereof into engagement with the other gear of said countershaft.

6. In a motor vehicle, the combination with a transmission mechanism thereof, a clutch having a pair of clutch faces, a clutch face engaging member positioned between said face and normally in engagement with one of the latter, a slidable transmission element directly connected with said clutch face engaging member, a shaft in said transmission in alignment with said element, means for establishing a direct drive between said element and shaft, a gear on said element, a gear on said shaft, a countershaft in said transmission, gears on said latter shaft one of which being normally in engagement with the gear of said first named shaft, the other of said gears being adapted for engagement with the gear of said element upon the shifting of the latter for establishing a contact between the clutch face engaging member and the other of said clutch faces.

7. In a motor vehicle, the combination with a clutch and a gear transmission thereof, a driven shaft in said transmission, a shiftable gear on said shaft, a sliding member positively connected with said clutch and arranged in axial alignment with said shaft, a gear on said member, a countershift, gears on said countershaft having varying pitch diameters and one of which is in engagement with the sliding gear of said driven shaft and the other adapted for engagement with the gear on said member upon the movement of the latter for driving connection with said clutch.

8. In a change speed mechanism, the combination with a gear transmission and a clutch equipped with a pair of clutch faces, a shiftable clutch face engaging member positioned between said face and normally in engagement with one of the latter, an element connected for movement with said clutch face engaging member, a pair of gears of varying diameters secured to said element, a shaft in said transmission also having a pair of gears of varying diameters and which are selectively engaged by the gears of said element upon the movement of said clutch face engaging member.

In testimony whereof I affix my signature.

WILLIAM I. SPANGLER.